United States Patent [19]

Hale

[11] Patent Number: 4,583,462
[45] Date of Patent: Apr. 22, 1986

[54] DRIVERLESS VEHICLE FOR TWO WAY ACCUMULATION

[75] Inventor: Robert A. Hale, Easton, Pa.

[73] Assignee: SI Handling Systems, Inc., Easton, Pa.

[21] Appl. No.: 514,051

[22] Filed: Jul. 15, 1983

[51] Int. Cl.[4] .......................... B61J 1/10; B61B 13/12
[52] U.S. Cl. ........................................ 104/48; 104/166
[58] Field of Search ................ 104/48, 165, 166, 167, 104/162; 198/472, 580; 414/236, 237, 239, 499, 679

[56] References Cited

U.S. PATENT DOCUMENTS 3,818,837 6/1974 Jacoby et al. .................... 104/166
3,854,413 12/1974 Broome ............................. 104/166
3,929,079 12/1975 Eliassen ........................... 104/48 X
4,132,174 1/1979 Ziegenfus et al. .................. 104/48
4,353,306 10/1982 Rohrbach et al. ................. 104/166
4,358,999 11/1982 Nagahori ........................... 104/166
4,389,941 6/1983 Berk et al. ....................... 104/166 X Primary Examiner—Randolph A. Reese

[57] ABSTRACT

A driverless vehicle has a platform mounted on support wheels for riding on rails. First and second drive wheels adapted for frictional contact with a drive tube are provided on the vehicle. The drive wheels are supported on opposite sides of a longitudinal center line for alternative use depending upon the direction of movement of the vehicle.

5 Claims, 3 Drawing Figures

DRIVERLESS VEHICLE FOR TWO WAY ACCUMULATION

BACKGROUND OF THE INVENTION

A vehicle of the general type involved herein and capable of accumulating in a single direction as taught by U.S. Pat. No. 3,818,837.

A vehicle which may accumulate in opposite directions is taught by U.S. Pat. No. 4,353,306. Thus, a driverless vehicle which has two way accumulation is per se old. The principal object of the present invention is to accomplish two way accumulation in a manner which is simpler and more reliable than that disclosed in the last mentioned patent. Thus, the present invention solves the problem of providing two way accumulation using standard components and providing a vehicle capable of use at a variety of speeds between 25 and 300 feet per minute with loads varying from 100 to 8000 pounds.

SUMMARY OF THE INVENTION

The present invention is directed to a driverless vehicle having a platform body mounted on support wheels. The support wheels are adapted to ride on a support surface such as tracks. The body is provided with first and second drive wheels adapted for frictional contact with the drive tube. The drive wheels are supported by the body on opposite sides of a longitudinal center line for alternative use depending upon the direction of movement to the vehicle.

Various objects and advantages of the present invention will appear hereinafter.

For the purpose of illustrating the invention, there is shown in the drawings a form which is presently preferred; it being understood, however, that this invention is not limited to the precise arrangements and instrumentalities shown.

DETAILED DESCRIPTION

Figure 1:
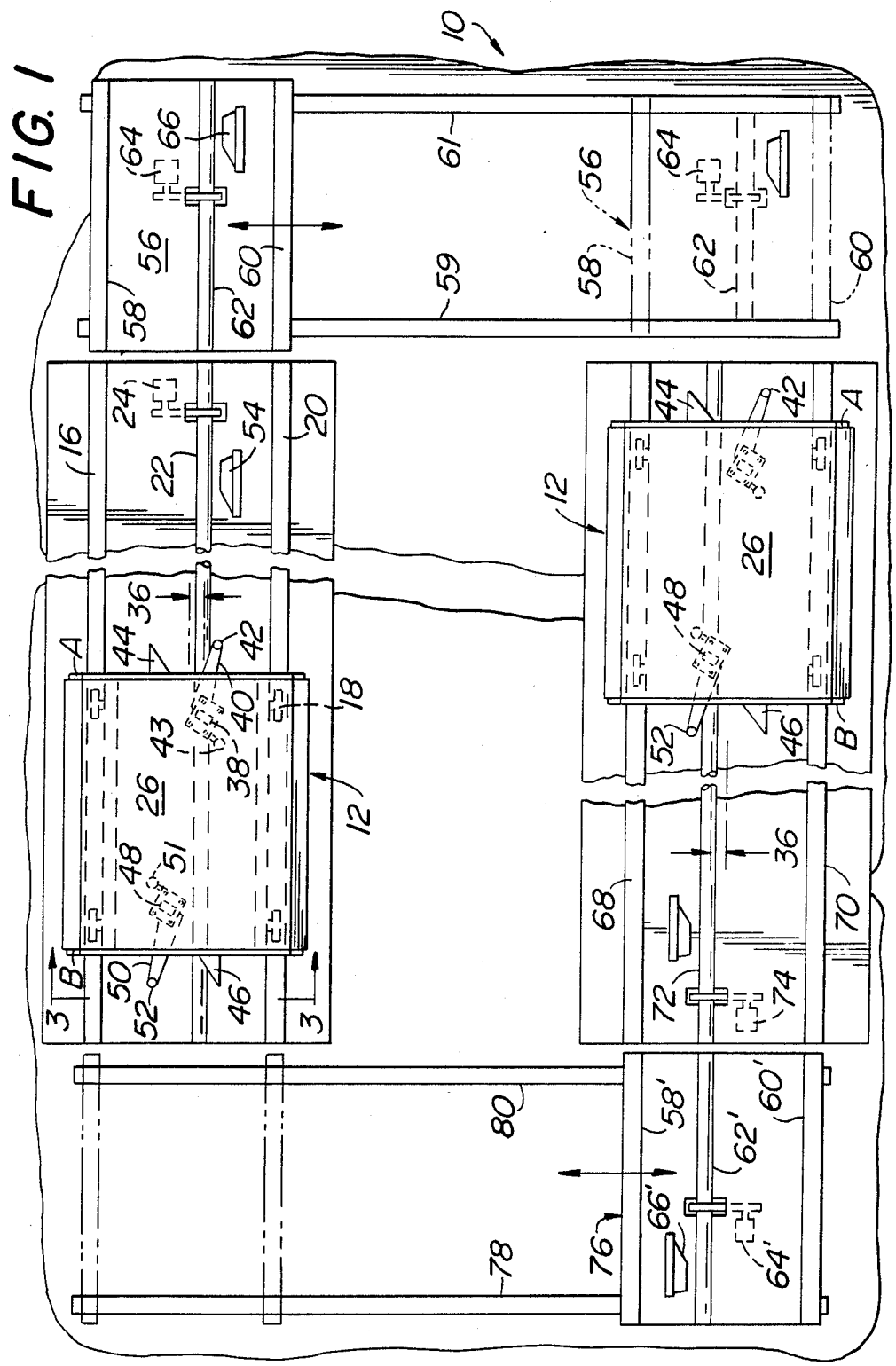
FIG. 1 is a plan view of a conveyor system incorporating the present invention.

Referring to the drawing in detail, wherein like numerals indicate like elements, there is shown a conveyor system designated generally as 10. The system 10 includes a driverless vehicle 12 structurally interrelated in a manner so as to provide for two way accumulation. While only one vehicle 12 is illustrated, it will be understood that a large number of such vehicles will simultaneously be provided along the conveyor 10.

Figure 2:
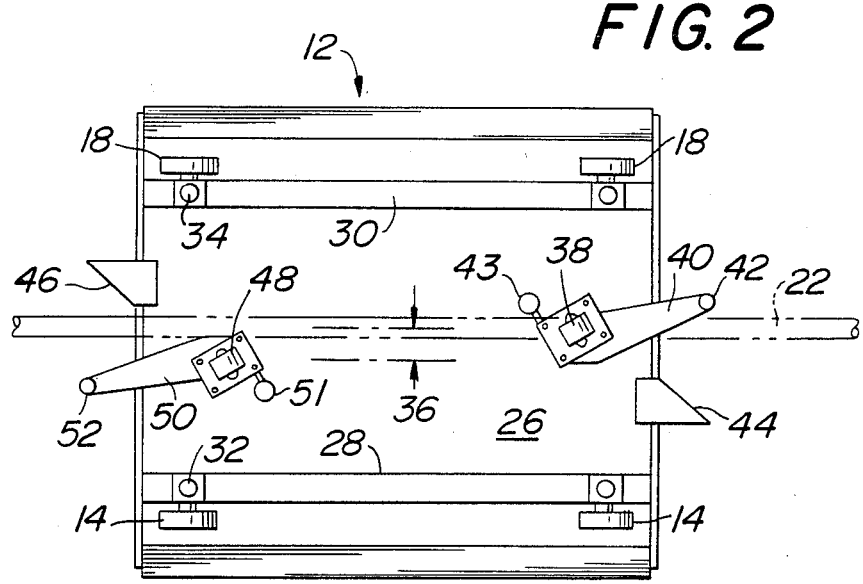
FIG. 2 is a bottom plan view of the driverless vehicle.
Figure 3:
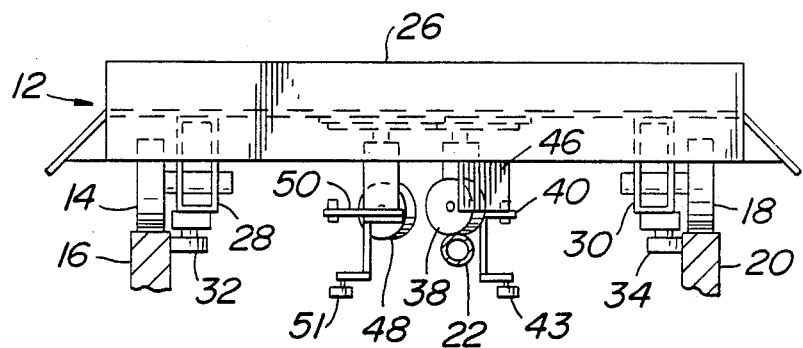
FIG. 3 is a sectional view taken along the line 3—3 in FIG. 1.

As shown more clearly in FIGS. 2 and 3, the vehicle 12 has support wheels 14 aligned with one another along one side of the vehicle and similar support wheels 18 on the other side of the vehicle. The support wheels 14 are adapted to ride on a surface such as rail 16. Similarly, the support wheels 18 are adapted to ride on a surface such as rail 20. A drive shaft 22 is provided between the rails 16 and 20. Drive shaft 22 is driven in a first direction and rotated about its longitudinal axis by a drive motor 24.

The body of vehicle 12 includes a platform 26. A channel 28 is fixed to and depends from the bottom surface of platform 26 for supporting the wheels 14. A similar channel is provided on the other side of the body and designated 30. Channel 30 supports the wheels 18. Guide wheels 32 are supported by the channel 28 for engaging a side face of rail 16. See FIG. 3. In a similar manner, channel 30 is provided with guide wheels 34. One end of vehicle 12 is designated A and the other end is designated B.

The longitudinal center line of the vehicle 12 is designated by the arrow 36. See FIGS. 1 and 2. It will be noted that the drive shaft 22 is disposed to one side of the center line of the vehicle 12. A drive wheel 38 is supported by the platform 26 in a conventional manner but spaced from center line 36. Drive wheel 38 has a member 40 extending therefrom and which at its free end supports a cam follower 42. Drive wheel 38 has a second cam follower 43 extending from the drive wheel casting. Drive wheel 38 is in frictional contact with the drive tube 22. As is well known to those skilled in the art, drive wheel 38 is spring biased downwardly into contact with the drive tube 22 and the speed of the vehicle will depend upon the angular position of drive wheel 38. Thus, when the horizontal axis of drive wheel 38 is parallel to the longitudinal axis of drive shaft 22, the vehicle 12 is stationary. A cam 44 is supported by the platform 26 at end A and is disposed on the other side of the center line 36 from the cam follower 42. See FIG. 1. Cam follower 42 and cam 44 are on the same end of the vehicle. Drive wheel 38 causes the vehicle 12 to move from left to right in FIG. 1 along the tracks 16 and 20.

At the end B of the vehicle, platform 26 has a cam 46 projecting therefrom. Cam 46 is on the opposite side of the center line 36 from the cam 44. Cams 44, 46 are equidistant from center line 36. Also, the body platform 26 supports a second drive wheel 48. Drive wheels 38 and 48 are equidistant from and on opposite sides of the center line 36. Drive wheel 48 has a projecting member 50 terminating in a cam follower 52. Drive wheel 48 has a second cam follower 51 extending from the drive wheel casting. The transverse distance between cam 44 and cam follower 42 is equal to the transverse distance between cam 46 and cam follower 52.

Adjacent one end of the tracks 16 and 20, namely the right hand end in FIG. 1, there is provided a cam 54. Cam 54 is adapted to cam the drive wheel 38 to a slow drive position by contact with the follower 43. Cam 54 will also stop the vehicle if a shuttle vehicle 56 is not in position to receive it. The vehicle 12 may transfer off tracks 16 and 20 onto mating tracks 58 and 60 on a shuttle vehicle 56. Vehicle 56 is mounted on tracks 59 and 61 whereby vehicle 56 is adapted to move in the direction of the double headed arrow in the upper right hand corner of FIG. 1.

Shuttle vehicle 56 supports a drive tube 62 which is driven by motor 64 in the same direction as drive shaft 22 with which it is aligned. As the vehicle 12 transfers onto the shuttle vehicle 56, it is driven onto the shuttle vehicle by the drive shaft 62 until follower 43 contacts the cam 66 and causes the vehicle 12 to stop. A limit switch not shown is tripped by the vehicle to stop motor 64. In the phantom position of the vehicle 56, drive shaft 62 is offset from with drive shaft 72 which is disposed between the tracks 68 and 70. Tracks 68 and 70 are parallel to tracks 16 and 20. Drive shaft 72 is parallel to drive shaft 22. It will be noted that the drive shaft 72 is in a position so as to be in frictional contact with drive wheel 48 and is adapted to propel the vehicle 12 from right to left in FIG. 1 along the tracks 68 and 70. Drive shaft 72 is driven by motor 74.

A shuttle vehicle 76 is supported for movement along the rails 78 and 80 as shown at the left hand end of FIG. 1. Shuttle vehicle 76 is identical with vehicle 56. Accordingly, corresponding elements are provided with corresponding primed numerals. The shuttle vehicle 76 is adapted to receive the vehicle 12 and transfer the same to a position wherein it is capable of being moved onto the tracks 16 and 20. Hence, it will be noted that the conveyor 10 is comprised of two parallel sets of tracks and a shuttle vehicle at each end of the tracks.

The motor 24 drives the shaft 22 in a direction whereby frictional contact between drive wheel 38 and drive shaft 22 propels the vehicle 12 along tracks 16 and 20 from left to right in FIG. 1. The drive wheels 38, 48 are spring biased to the drive position as shown in FIG. 1. As the vehicle 12 moves along tracks 16 and 20, the drive wheel 48 is suspended out of contact with any other structure as shown more clearly in FIG. 3. If another vehicle on tracks 16 and 20 in front of vehicle 12 is stationary, cam follower 42 contacts cam 46 on the stationary vehicle and move the drive shaft 38 to a slow or stationary position so as to prevent abrupt collision between the two vehicles. At desired locations along the tracks 16 and 20, there will be provided one or more speed control devices such as cam 54 for causing the vehicle 12 to slow down or stop for any one of a variety of purposes including loading, unloading, etc.

Vehicle 12 transfers off the tracks 16 and 20 onto the tracks 58, 60 of shuttle vehicle 56 under the frictional contact between the drive wheel 38 and drive shaft 62. When all of the wheels 14 and 18 are supported by the tracks 58 and 60, cam 66 will contact cam follower 43 and move the drive wheel 38 to a stationary position. A limit switch not shown will be tripped and cause the vehicle 56 to be propelled along tracks 59 and 61 by a motor not shown. When the shuttle vehicle 56 reaches the phantom position shown in FIG. 1, it will trip a limit switch to stop the drive motor for the vehicle 56. At this point, drive shaft 62 will not be aligned with drive shaft 72, but tracks 58, 60 will be aligned with tracks 68, 70 respectively.

As soon as track 58 aligns with track 68 and track 60 is aligned with shaft 70, a microswitch not shown will be tripped so as to cause motor 64 to rotate in an opposite direction whereby frictional contact between drive wheel 38 and drive shaft 62 propels the vehicle 12 off shuttle vehicle 56 from right to left in FIG. 1. Drive wheel 48 immediately contacts the drive shaft 72 and vehicle 12 is thereafter propelled from right to left in FIG. 1. As vehicle 12 is moving from right to left along rails 68 and 70, drive wheel 38 is out of contact with any other element.

If vehicle 12 approaches another stationary vehicle in front of it on the tracks 68 and 70, cam follower 52 will contact a cam corresponding to cam 44 and move the drive wheel 48 against its spring bias to a stop position. As soon as the obstacle is removed, the vehicle 12 will again commence movement from right to left in FIG. 1. Vehicle 12 will transfer onto the shuttle vehicle 76 and be transferred to a position from the lower left hand corner of FIG. 1 to the upper left hand corner of FIG. 1 in the same manner as described above in connection with vehicle 56. Regardless of the direction of movement of the vehicle 12, there is provided two way accumulation without having to turn the vehicle around.

The number of drive wheels utilized to move vehicle 12 in a given direction varies with the load. As the load increases, it would be necessary to provide a pair of drive wheels 38 coupled together and a pair of drive wheels 48 coupled together. Thus, it will be noted that accumulation herein occurs in the manner as disclosed in the aforementioned U.S. Pat. No. 3,818,837. However, accumulation herein can incur in opposite directions whereas accumulation can only occur in said patent in a single direction.

The present invention may be embodied in other specific forms without departing from the spirit or essential attributes thereof and, accordingly, reference should be made to the appended claims, rather than to the foregoing specification, as indicating the scope of the invention.

I claim:

1. A driverless vehicle comprising a body having support wheels for riding on a support surface, first and second drive wheels adapted for frictional contact with a drive tube, each drive wheel being movable between a drive position and a stop position, said drive wheels being connected to the bottom of said body on opposite sides of and equidistant from a longitudinal center line on said body for alternative use depending upon the direction of movement of the vehicle, each drive wheel having a member projecting beyond a different free end of the vehicle body and terminating in a cam follower, the cam followers being on opposite sides of the vehicle center line, a discrete cam projecting from each end of the vehicle, said cams being on opposite sides of said center line, and at each end of the vehicle the cam and cam follower being on opposite sides of said center line and the transverse distance therebetween being uniform.

2. A driverless vehicle comprising a body having support wheels for riding on a support surface, first and second drive wheels adapted for frictional contact with a drive tube, each drive wheel being movable between a drive position and a stop position, said drive wheels being connected to the bottom of said body and independent of one another for alternative use depending upon the direction of movement of the vehicle, each drive wheel having a member projecting beyond a different free end of the vehicle body and terminating in a cam follower, the cam followers being at a first elevation on opposite sides of the vehicle center line, a discrete cam projecting from each end of the vehicle, said cams being on opposite sides of said vehicle center line, at each end of the vehicle the cam and cam follower being on opposite sides of said center line at approximately the same elevation with the transverse distance therebetween being substantially the same, and each drive wheel having a housing to which is attached a cam follower at a second elevation, said second elevation being below said first elevation.

3. A system including a vehicle in accordance with claim 2 mounted on a first set of tracks for movement in a first direction using said first drive wheel, a second set of tracks having means for moving said vehicle in an opposite direction while using said second drive wheel, and a shuttle vehicle for transporting said driverless vehicle between said sets of tracks.

4. A system in accordance with claim 3 wherein each set of tracks has a drive tube associated therewith, each drive tube being spaced from its tracks by a distance which enbles it to frictionally contact only one of said drive wheels.

5. A driverless vehicle comprising: a body having support wheels for riding on a support surface; first and second drive wheels adapted for frictional contact with a drive tube, said drive wheels being supported by said body on opposite sides of the longitudinal center line for alternate use depending upon the direction of movement of the vehicle, said drive wheels supported adjacent to opposite ends of the body; each said drive wheel having a member projecting beyond a free end of the vehicle body and terminating in a cam follower for initiating accumulation as the vehicle body moves in opposite directions, each said cam follower being on opposite sides of the vehicle center line; and a discrete cam projecting from each end of the vehicle, said cams being on opposite sides of said center line, the cam at each end of the vehicle being on opposite sides of the center line from said drive wheel and said cam follower of said respective end of said body.

* * * * *